US010979609B2

(12) United States Patent
Motoshima et al.

(10) Patent No.: US 10,979,609 B2
(45) Date of Patent: *Apr. 13, 2021

(54) IMAGE SENSOR COMPRISING LENS MODULE AND IMAGING MODULE MOUNTED ON BODY MODULE

(71) Applicant: OMRON Corporation, Kyoto (JP)

(72) Inventors: Hiroaki Motoshima, Kyoto (JP);
Kosuke Watanabe, Kyoto (JP);
Yasuhito Uetsuji, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/387,503

(22) Filed: Apr. 17, 2019

(65) Prior Publication Data

US 2019/0356825 A1    Nov. 21, 2019

(30) Foreign Application Priority Data

May 17, 2018  (JP) .............................. JP2018-095438

(51) Int. Cl.
| | |
|---|---|
| H04N 5/225 | (2006.01) |
| H04N 5/357 | (2011.01) |
| H04N 5/232 | (2006.01) |
| H04N 5/217 | (2011.01) |
| G02B 27/00 | (2006.01) |

(Continued)

(52) U.S. Cl.
CPC ....... *H04N 5/2254* (2013.01); *G02B 27/0012* (2013.01); *G02B 27/0025* (2013.01); *G03B 17/14* (2013.01); *H04N 5/217* (2013.01); *H04N 5/2252* (2013.01); *H04N 5/2253* (2013.01); *H04N 5/2257* (2013.01); *H04N 5/23296* (2013.01); *H04N 5/3572* (2013.01); *H04N 9/04517* (2018.08)

(58) Field of Classification Search
CPC .. H04N 5/2254; H04N 5/2253; H04N 5/2257; H04N 5/3572; H04N 9/04517; H04N 9/04519; H04N 5/2176; H04N 5/23296; G03B 17/14; G02B 27/0025; G02B 27/0012
See application file for complete search history.

(56) References Cited

U.S. PATENT DOCUMENTS

| | | | | |
|---|---|---|---|---|
| 2003/0193571 | A1* | 10/2003 | Schultz .................. | H04N 5/225 348/207.99 |
| 2008/0174678 | A1* | 7/2008 | Solomon ................. | G06T 7/194 348/231.99 |

(Continued)

FOREIGN PATENT DOCUMENTS

JP    6284276    2/2018

*Primary Examiner* — Twyler L Haskins
*Assistant Examiner* — Akshay Trehan
(74) *Attorney, Agent, or Firm* — JCIPRNET

(57) ABSTRACT

An image sensor capable of performing satisfactory distortion aberration correction on an imaging result regardless of a combination of a lens module and an imaging module being used is provided. A main body module of an image sensor acquires size information of an imaging element from a mounted imaging module, acquires distortion aberration characteristic information of an optical system from the mounted lens module, and performs distortion aberration correction using the acquired information.

2 Claims, 7 Drawing Sheets

(51) Int. Cl.
*G03B 17/14* (2021.01)
*H04N 9/04* (2006.01)

(56) References Cited

U.S. PATENT DOCUMENTS

| | | | |
|---|---|---|---|
| 2008/0225405 A1* | 9/2008 | Kuroda | G02B 15/173 359/687 |
| 2010/0060747 A1* | 3/2010 | Woodman | G03B 17/02 348/222.1 |
| 2010/0165138 A1* | 7/2010 | Jannard | H04N 5/2251 348/222.1 |
| 2010/0165188 A1* | 7/2010 | Jannard | H04N 5/2251 348/375 |
| 2011/0013051 A1* | 1/2011 | Suzui | H04N 5/23212 348/241 |
| 2011/0043667 A1* | 2/2011 | Kotani | H04N 5/23293 348/241 |
| 2012/0229673 A1* | 9/2012 | Solomon | H04N 5/3572 348/231.99 |
| 2013/0111464 A1* | 5/2013 | Markas | G06F 8/447 717/174 |
| 2014/0160304 A1* | 6/2014 | Galor | H04N 5/23206 348/207.1 |
| 2014/0192239 A1* | 7/2014 | Ajito | H04N 5/23209 348/252 |
| 2014/0204265 A1* | 7/2014 | Sunaga | H04N 5/23209 348/346 |
| 2014/0240554 A1* | 8/2014 | Uchida | H04N 5/23296 348/240.99 |
| 2016/0112646 A1* | 4/2016 | Tsunoda | H04N 5/23296 348/240.2 |
| 2018/0157152 A1* | 6/2018 | Ajito | H04N 5/3572 |
| 2018/0299748 A1* | 10/2018 | Watanabe | G02B 7/365 |
| 2019/0102868 A1* | 4/2019 | Beric | G06T 3/0018 |

* cited by examiner

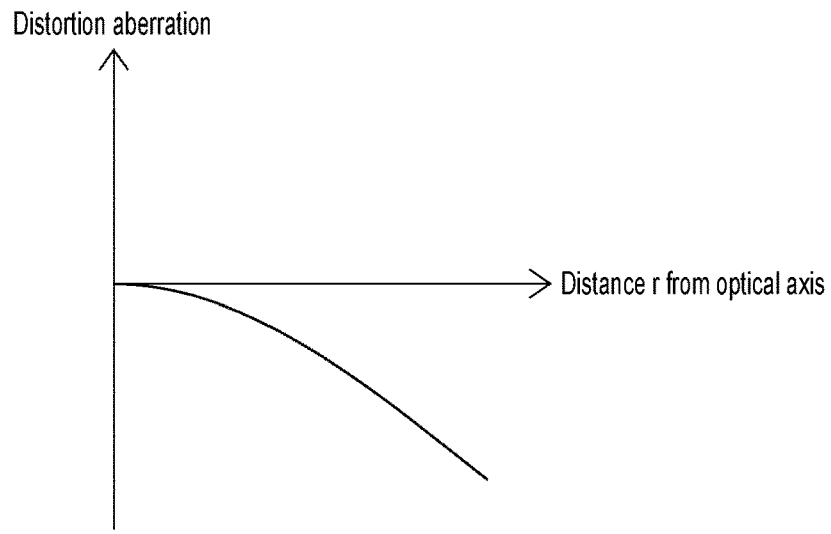
FIG. 4
| Distance r from optical axis[mm] | 0.0 | 0.1 | 0.2 | | 10.0 |
|---|---|---|---|---|---|
| Distortion aberration[%] | 0.00 | −0.01 | −0.03 | | −3.00 |
FIG. 5
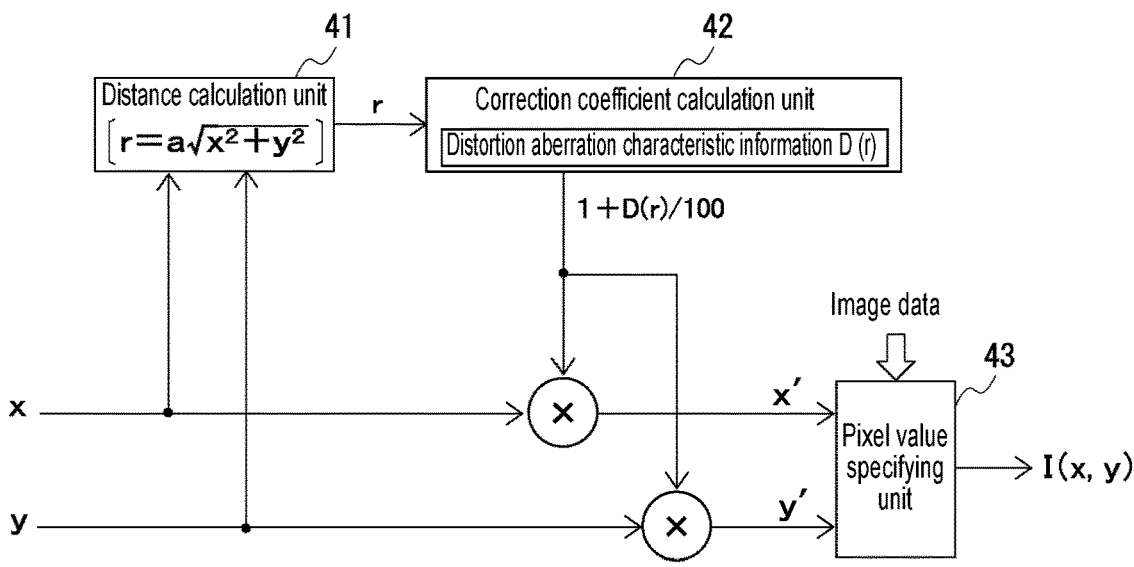
FIG. 6

IMAGE SENSOR COMPRISING LENS MODULE AND IMAGING MODULE MOUNTED ON BODY MODULE

CROSS-REFERENCE TO RELATED APPLICATION

This application claims the priority of Japan patent application serial No. 2018-095438, filed on May 17, 2018. The entirety of the above-mentioned patent application is hereby incorporated by reference herein and made a part of this specification.

BACKGROUND

Technical Field

The disclosure relates to a modular type image sensor constituted by a combination of a plurality of modules.

Description of Related Art

In production lines of factories, image processing systems have been used in order to automate product inspection and management and save labor. Although a system in which a camera and an image processing device are connected to each other through a cable (see Japanese Patent No. 6284276) has been generally used as an image processing system for a production line, an image processing system in which a camera and an image processing device are integrated so that imaging and image processing can be performed by a single device has also been developed, recently.

The angle of view and resolution of an imaging result (image data) which are desired for an image processing system in which a camera and an image processing device are integrated with each other (hereinafter referred to as an image sensor) vary depending on the size of an inspection target, an installation environment, and the like. For this reason, in the related art, manufacturers providing image sensors line up a large number of products having different specifications such as an angle of view, and users can select products having optimal specifications.

However, as IoT development in factories accelerates, the scope of application of image sensors is expanding, which makes it difficult to provide product variations that cover users' needs as they diversify. In addition, a need to change a portion of an image sensor (an optical system, an imaging element) in order to achieve optimization for inspection with short cycles of changes in an inspection target such as mass customization to meet the preference of each customer for differentiation from competitors in competition for commodities, expansion of provision of seasonal products, and a reduction in the lifecycle of a digital apparatus commodity represented by a smartphone has also been increasing.

For this reason, modulizing an optical system and an imaging element of an image sensor so that a user can freely combine the optical system and the imaging element with each other can be conceived. However, since details of distortion aberration correction to be performed on an imaging result vary depending on a combination of the optical system and the imaging element, realization of an image sensor performing satisfactory distortion aberration correction on an imaging result regardless of a combination of the optical system and the imaging element being used is not possible when the image sensor is simply modulized.

SUMMARY

According to an embodiment, an image sensor includes a main body module, and a lens module and an imaging module mounted on the main body module, in which the main body module includes an acquisition unit which acquires size information indicating a number of pixels and/or a pixel size of an imaging element provided within the imaging module from the mounted imaging module, and acquires distortion aberration characteristic information indicating distortion aberration characteristics of an optical system provided within the lens module from the mounted lens module, and a correction unit which performs distortion aberration correction on image data output by the imaging module by using the size information and the distortion aberration characteristic information acquired by the acquisition unit.

BRIEF DESCRIPTION OF THE DRAWINGS

FIG. 4 is a diagram illustrating distortion aberration characteristics.

FIG. 5 is a diagram illustrating an example of a data structure of distortion aberration characteristic information.

FIG. 6 is a functional block diagram of a correction unit within the main body module.

DESCRIPTION OF THE EMBODIMENTS

The disclosure provides an image sensor which is constituted by a main body module, and a lens module and an imaging module mounted on the main body module, and which is capable of performing satisfactory distortion aberration correction on an imaging result regardless of a combination of the lens module and the imaging module being used.

The image sensor has a configuration in which details of distortion aberration correction performed by the correction unit vary depending on a combination of the lens module and the imaging module mounted on the main body module. Therefore, the image sensor of the above-described aspect can obtain image data that is satisfactorily subjected to distortion aberration correction with any combination of the lens module and the imaging module mounted on the main body module.

In addition, the distortion aberration characteristics of the zoomable lens module (optical system) vary depending on a zoom setting value. Therefore, in a case where the image sensor is realized as a sensor in which a zoomable lens module is selectable, according to an embodiment, the image sensor may adopt a configuration in which "the acquisition unit of the main body module acquires distortion aberration characteristic information based on a zoom setting value of the lens module from the mounted lens module in a case where a zoomable lens module is mounted on the main body module."

According to the disclosure, it is possible to provide an image sensor which is capable of performing satisfactory distortion aberration correction on an imaging result without depending on a combination of a lens module and an imaging module being used.

Hereinafter, embodiments of the disclosure will be described with reference to the accompanying drawings.

First Embodiment

Figure 1:
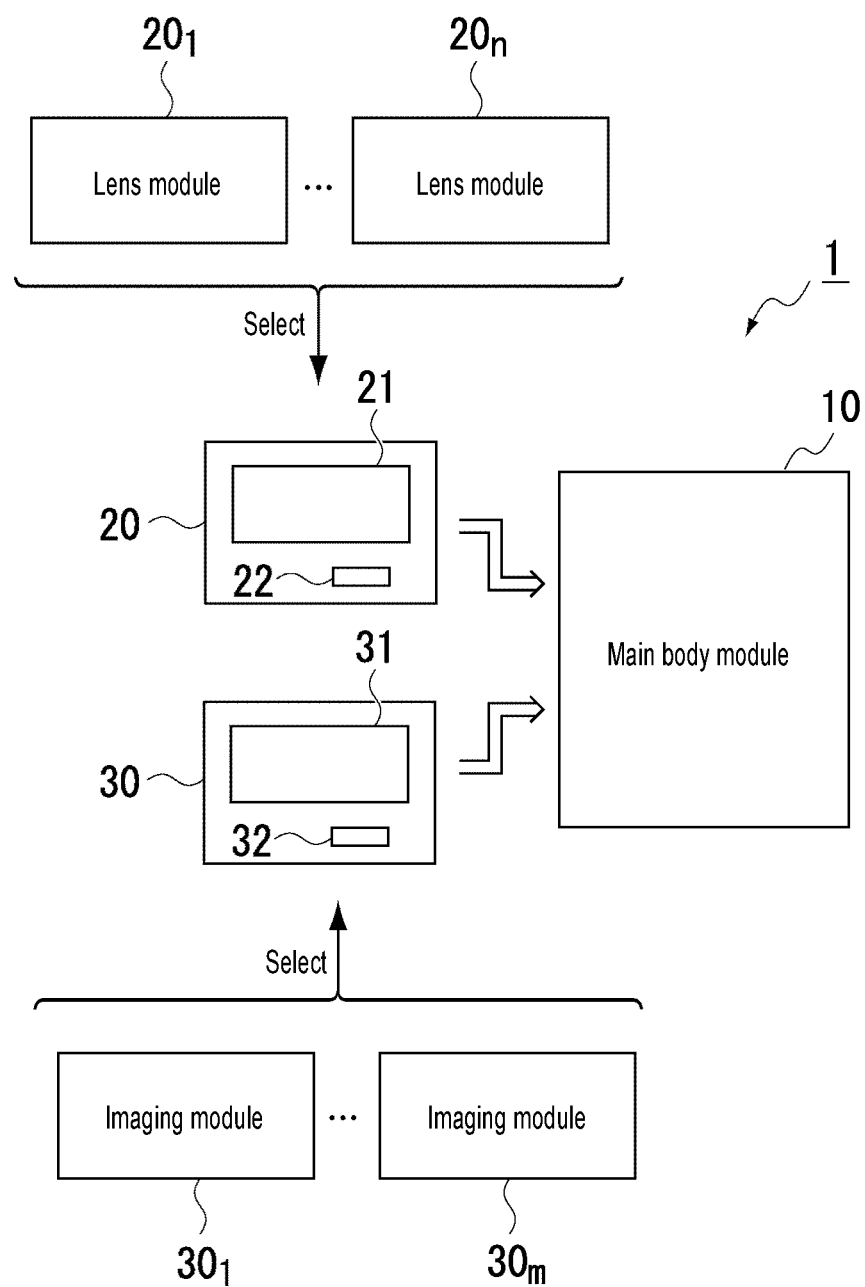
FIG. 1 is a diagram illustrating a schematic configuration of an image sensor according to a first embodiment.
Figure 2:
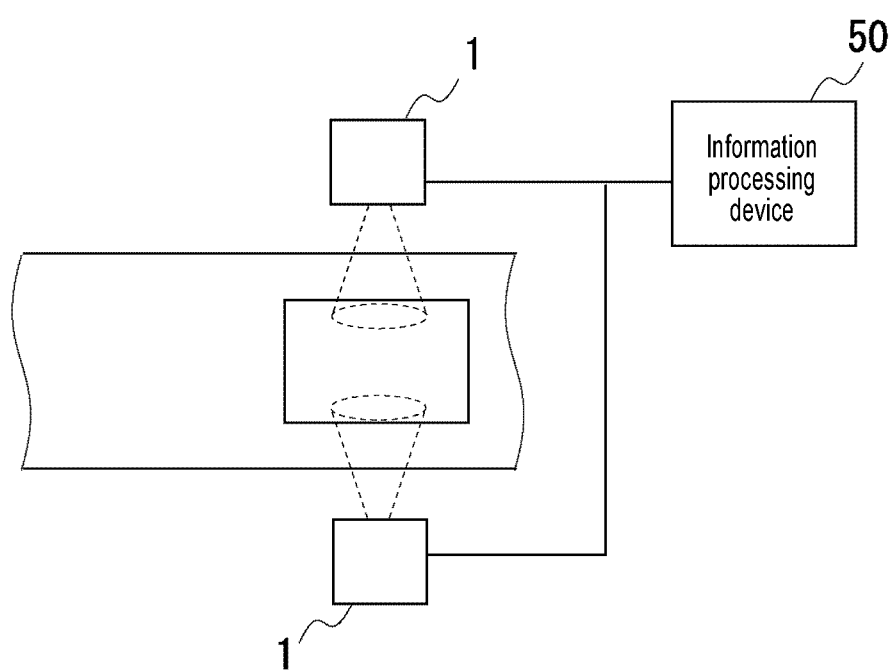
FIG. 2 is a diagram illustrating an example of the use of the image sensor.

FIG. 1 illustrates a schematic configuration of an image sensor 1 according to the present embodiment, and FIG. 2 illustrates an example of the use of the image sensor 1.

As illustrated in FIG. 1, the image sensor 1 of the present embodiment is a device configured by mounting a lens module 20 and an imaging module 30 on a main body module 10. In addition, as illustrated in FIG. 2, the image sensor 1 is developed on the assumption that the image sensor is used by being provided at a plurality of locations such as a production line or the like and processing results of the respective image sensors 1 are collected by one information processing device 50.

The imaging module 30 (FIG. 1) is a module including an imaging element 31 such as a CMOS image sensor or a CCD image sensor. As the imaging module 30 mountable on the main body module 10, imaging modules $30_1$ to $30_m$ of m types having different specifications of the imaging element 31 (a pixel size and the number of pixels (the numbers of pixels in the X direction and the Y direction)) are prepared. A non-volatile memory 32 (the use of which will be described later) such as a serial EEPROM is provided inside each imaging module 30.

The lens module 20 is a module including an optical system 21 for forming an image of light emitted from an imaging target on an image surface of the imaging element 31. As the lens module 20, lens modules $20_1$ to $20_n$ of types having different distortion aberration characteristics of the optical system 21 are prepared. A non-volatile memory 22 (the use of which will be described later) such as a serial EEPROM is provided inside each lens module 20.

The main body module 10 is a module that performs distortion aberration correction on image data received from the imaging module 30 and performs various processes (a process of reading a bar code or the like, a process of determining whether or not an abnormality has occurred, and the like) by analyzing the image data that is subjected to the distortion aberration correction.

Figure 3:
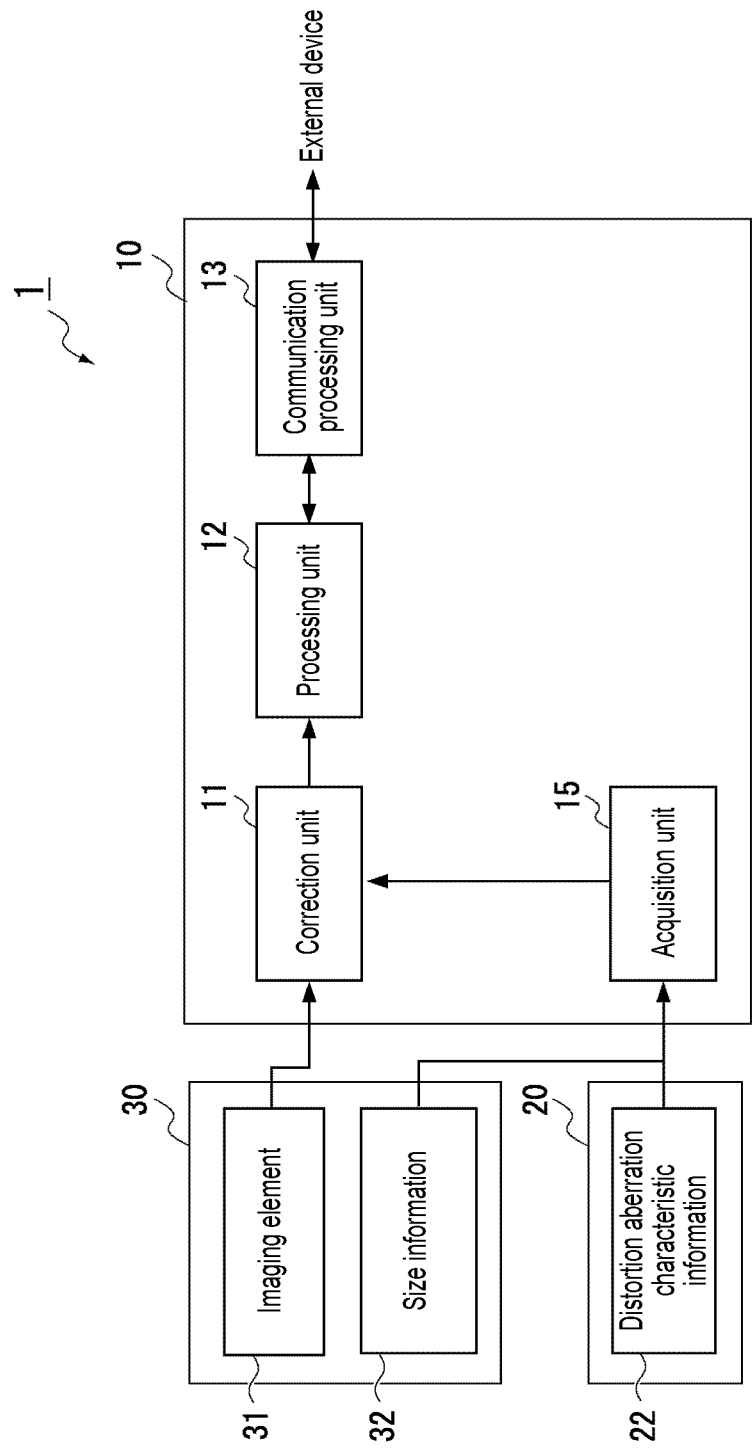
FIG. 3 is a functional block diagram of the image sensor.

In order to make it possible to perform satisfactory distortion aberration correction on all combinations of the lens module 20 and the imaging module 30, a configuration illustrated in FIG. 3 is adopted for the image sensor 1 according to the present embodiment.

That is, the non-volatile memory 32 of each imaging module 30 for the image sensor 1 stores size information indicating a pixel size and the number of pixels (the numbers of pixels in the X direction and the Y direction) of the imaging element 31 within the imaging module 30. In addition, the non-volatile memory 22 of each lens module 20 for the image sensor 1 stores distortion aberration characteristic information indicating distortion aberration characteristics of the optical system 21 within the lens module 20.

A distortion aberration of the optical system 21 varies, for example, as illustrated in FIG. 4, depending on a distance r from an optical axis. Here, the distortion aberration (hereinafter, also referred to as D(r)) is a value represented by the following expression when distances of an ideal image and a real image from the optical axis are respectively denoted by r and r'.

$$D(r)[\%]=100 \cdot (r'-r)/r \quad (1)$$

Meanwhile, barrel type distortion occurs in a distortion aberration characteristic illustrated in FIG. 4 in which the value of each D(r) is a negative value. The value of each D(r) may be a positive value in a distortion aberration characteristic, and the sign of the value of D(r) may vary depending on the value of r. Bobbin type distortion occurs in the former case, and so-called conical hat type distortion occurs in the latter case.

The distortion aberration characteristic information on the non-volatile memory 22 may be respective coefficients of a polynomial expression (for example, a quintic polynomial) of r for approximating distortion aberration characteristics (r dependency of a distortion aberration) as illustrated in FIG. 4. In addition, the distortion aberration characteristic information may be information constituted by distortion aberrations with respect to various r values as schematically illustrated in FIG. 5.

Returning to FIG. 3, the description of the image sensor 1 will continue.

The main body module 10 of the image sensor 1 includes a correction unit 11, a processing unit 12, a communication processing unit 13, and an acquisition unit 15. Meanwhile, respective units of the main body module 10 illustrated in FIG. 3 are so-called functional blocks. The correction unit 11 is normally realized by an IC for image processing (FPGA, ASIC, or the like). However, the correction unit 11 may be a unit that performs distortion aberration correction by software. The communication processing unit 13 is realized by, for example, a network interface circuit. In addition, the processing unit 12 and the acquisition unit 15 are realized by, for example, a microcontroller in which programs for the image sensor 1 are stored.

The processing unit 12 within the main body module 10 is a unit that performs various processes (a process of reading a code, a process of determining whether or not an abnormality has occurred, and the like) by analyzing image data that is subjected to distortion aberration correction. The communication processing unit 13 is a unit which is used to perform communication between the processing unit 12 and an external device (the information processing device 50 or the like).

The acquisition unit 15 is a unit that reads out distortion aberration characteristic information and size information from the non-volatile memories 22 and 32 of the lens module 20 and the imaging module 30 which are mounted on the main body module 10 when power is supplied to the main body module 10, or the like and sets the read-out information in the correction unit 11.

The correction unit 11 is a unit that performs distortion aberration correction of details specified by the set distortion aberration characteristic information and size information on image data received from the imaging module 30.

FIG. 6 illustrates a functional block diagram of the correction unit 11. As illustrated in the drawing, the correction unit 11 includes a distance calculation unit 41, a correction coefficient calculation unit 42, a multiplier M1, a multiplier M2, and a pixel value specification unit 43. Meanwhile, in this drawing and the following description of this drawing, x and y represent pixel coordinates in a coordinate system with the position of the optical axis as the origin (0, 0). In addition, the correction unit 11 ascertains a coordinate range to be processed from the set number of pixels (the numbers of pixels in the X direction and the Y direction), and the respective units within the correction unit 11 operate as follows with respect to the respective pixel coordinates within the coordinate range to be processed.

The distance calculation unit 41 calculates a distance r of a pixel from the optical axis (a pixel at the position of the optical axis) using coordinates (x, y) of the pixel for which a pixel value is to be calculated and a set pixel size "a". The correction coefficient calculation unit 42 calculates D (r) from the distance r using the set distortion aberration characteristic information and calculates a correction coefficient "1+D (r)/100" from the calculated D (r). Meanwhile, in a case where information as illustrated in FIG. 5 is adopted as distortion aberration characteristic information, a unit that calculates D(r) from a weighted average of distortion aberrations in two distances before and after the distance r, and the like in the distortion aberration characteristic information is, in an embodiment, adopted as the correction coefficient calculation unit 42. However, in the above-described case, a unit having a distortion aberration of D(r) associated with the shortest distance from the distance r in the distortion aberration characteristic information may be adopted as the correction coefficient calculation unit 42.

The multiplier M1 calculates x' by multiplying the correction coefficient calculated by the correction coefficient calculation unit 42 by x, and the multiplier M2 calculates y' by multiplying the same correction coefficient by y. In addition, the pixel value specification unit 43 obtains a pixel value of coordinates (x', y') from image data before distortion aberration correction and outputs the obtained pixel value as a pixel value I(x, y) of image data after the distortion aberration correction. The pixel value specification unit 43 may be either a unit that obtains the pixel value of coordinates (x', y') using a nearest neighbor method or a unit that obtains the pixel value of coordinates (x', y') using another method (a bi-linear method, a bicubic method, and the like).

Here, the significance of the above-described process using the correction unit 11 will be described.

Figure 7:
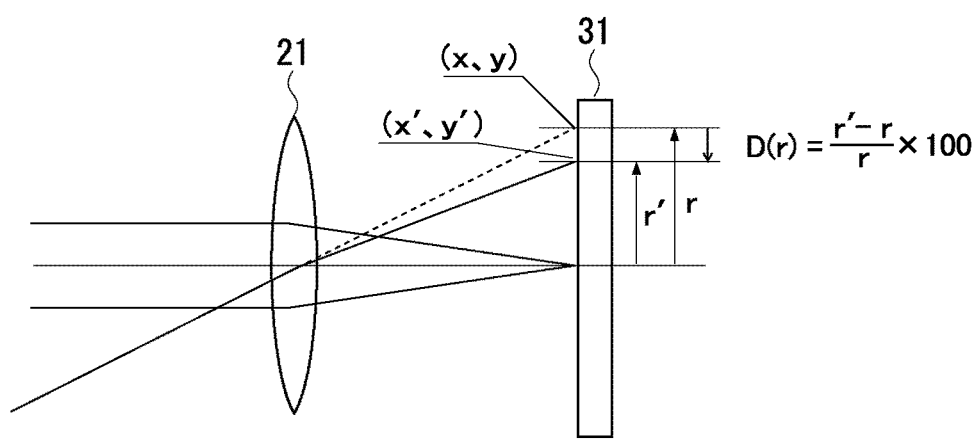
FIG. 7 is a diagram illustrating details of a correction process performed by the correction unit.

As illustrated in FIG. 7, when a distortion aberration occurs in the optical system 21, the light to reach the coordinate (x, y) in which a distance from the optical axis is r reaches the coordinate (x·r'/r, y·r'/r). Therefore, when a pixel value of the coordinate (x·r'/r, y·r'/r) is obtained from image data before distortion aberration correction, it is possible to obtain element data (a pixel value of the coordinate (x, y)) of image data after the distortion aberration correction.

In addition, when Expression (1) which is a definition expression of a distortion aberration D(r) is solved for "r'/r", the following expression (2) is obtained.

$$r'/r = 1 + D(r)/100 \quad (2)$$

Therefore, when "1+D (r)/100" is multiplied by x and y, "x·r'/r" (=x') and "y·r'/r" (=y') can be obtained. In addition, since x' and y' are normally non-integral, a pixel value of coordinate (x', y') is obtained by the pixel value specification unit 43 using a nearest neighbor method or the like.

As described above, the main body module 10 of the image sensor 1 can perform distortion aberration correction of details based on a combination of the lens module 20 and the imaging module 30 mounted thereon on image data received from the imaging module 30. Therefore, when the above-described configuration is adopted, it is possible to realize the image sensor 1 that enables a user to select the lens module 20 and the imaging module 30 without considering performance degradation due to a distortion aberration.

Second Embodiment

Hereinafter, a configuration and operations of an image sensor 1 according to a second embodiment will be described focusing on portions different from those of the image sensor 1 according to the first embodiment by using the same reference numerals and signs as those used in description of the image sensor 1 according to the first embodiment. Meanwhile, for convenience of description, an image sensor 1 according to an L-th (L=1, 2) embodiment will also be hereinafter referred to as an L-th image sensor 1.

Figure 8:
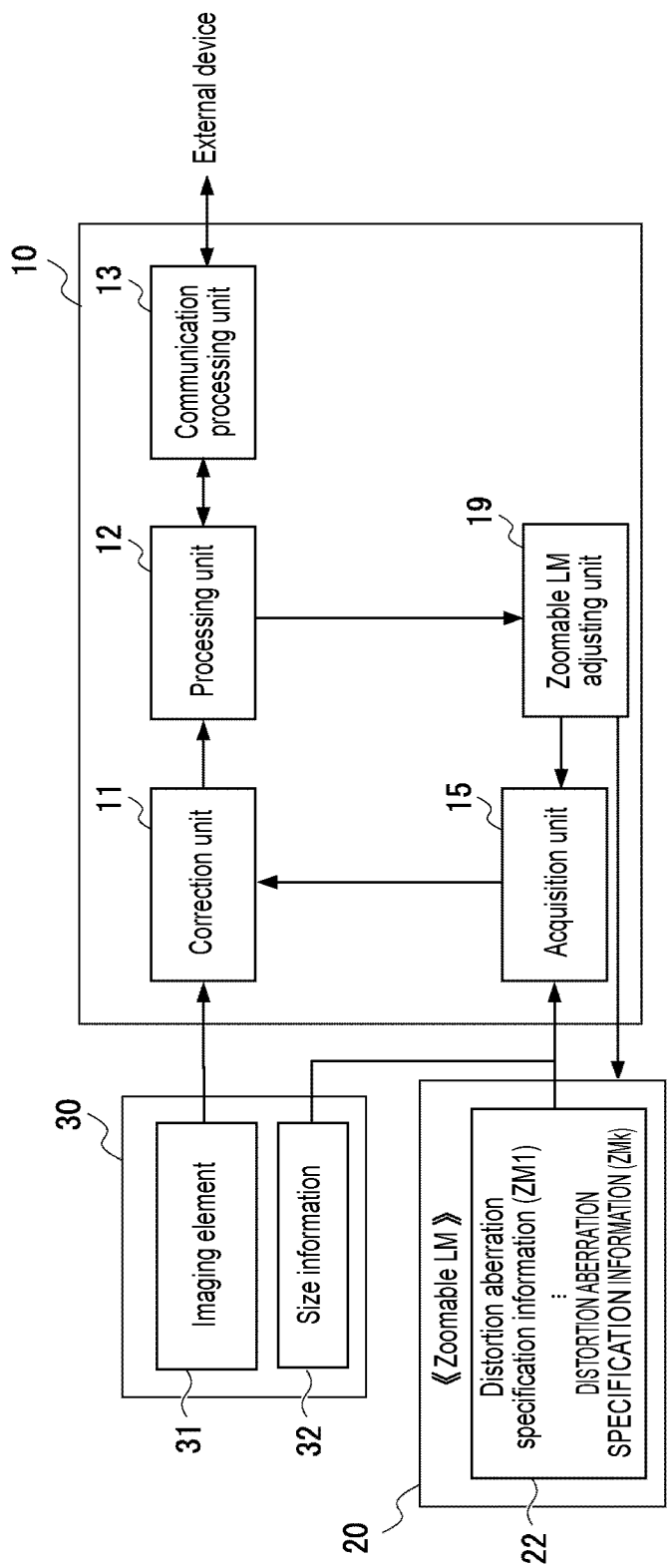
FIG. 8 is a functional block diagram of an image sensor according to a second embodiment.

FIG. 8 illustrates a schematic configuration of a second image sensor 1 (the image sensor 1 according to the second embodiment).

The second image sensor 1 is a device which is configured by mounting a lens module 20 and an imaging module 30 on a main body module 10, similar to the first image sensor 1 (see FIG. 1). The imaging module 30 for the second image sensor 1 is the same as the imaging module 30 for the first image sensor 1. However, the lens module 20 for the second image sensor 1 includes zoomable lens modules 20 (hereinafter, referred to as zoomable LMs 20) of k (≥1) types.

When the zoom setting value of the zoomable LM 20 is changed, an exit pupil position is changed, and as a result, distortion aberration characteristics are changed. In order to make it possible to cope with such a change, distortion aberration characteristic information is stored for each settable zoom setting value ("ZM1" and "ZMk" in FIG. 8) in the non-volatile memory 22 of the zoomable LM 20.

In addition, the main body module 10 of the second image sensor 1 includes a zoomable LM adjusting unit 19 for changing a setting related to zoom of the zoomable LM 20. The zoomable LM adjusting unit 19 has a function of notifying an acquisition unit 15 of the present (after change) zoom setting value at the time of changing setting of zoom and a function of notifying the acquisition unit 15 of the present zoom setting value in response to a predetermined request received from the acquisition unit 15.

In addition, the main body module 10 of the second image sensor 1 is configured (programmed) such that the acquisition unit 15 performs the following processes.

The acquisition unit 15 determines whether or not the lens module 20 mounted on the main body module 10 is the zoomable LM 20 by confirming the number of pieces of distortion aberration characteristic information on the non-volatile memory 22 when power is supplied to the main body module 10. Further, in a case where the lens module 20 mounted on the main body module 10 is not the zoomable LM 20, the acquisition unit 15 performs a process of setting distortion aberration characteristic information on the non-volatile memory 22 and pixel information on the non-volatile memory 32 in the correction unit 11.

On the other hand, in a case where the lens module 20 mounted on the main body module 10 is a zoomable LM 20, the acquisition unit 15 acquires the present zoom setting value from the zoomable LM adjusting unit 19. In addition, the acquisition unit 15 performs a process of reading out distortion aberration characteristic information associated with the acquired zoom setting value from the non-volatile memory 22 and setting the read-out information in the correction unit 11 and a process of reading out size information from the non-volatile memory 32 and setting the read-out information in the correction unit 11.

Further, in a case where the present zoom setting value is notified from the zoomable LM adjusting unit 19, the acquisition unit 15 reads out distortion aberration characteristic information associated with the zoom setting value that is notified from the non-volatile memory 22 and sets the read-out information in the correction unit 11.

As described above, also in a case where the zoom of the zoomable LM 20 is changed, the main body module 10 of the image sensor 1 according to the present embodiment can perform distortion aberration correction of details based on conditions after the change on image data received from the imaging module 30. Therefore, when the above-described configuration is adopted, it is possible to realize the image sensor 1 that enables a user to select the lens module 20 and the imaging module 30 and also select the zoomable LM 20 as the lens module 20 without considering performance degradation due to a distortion aberration.

Modification Example

Figure 9:
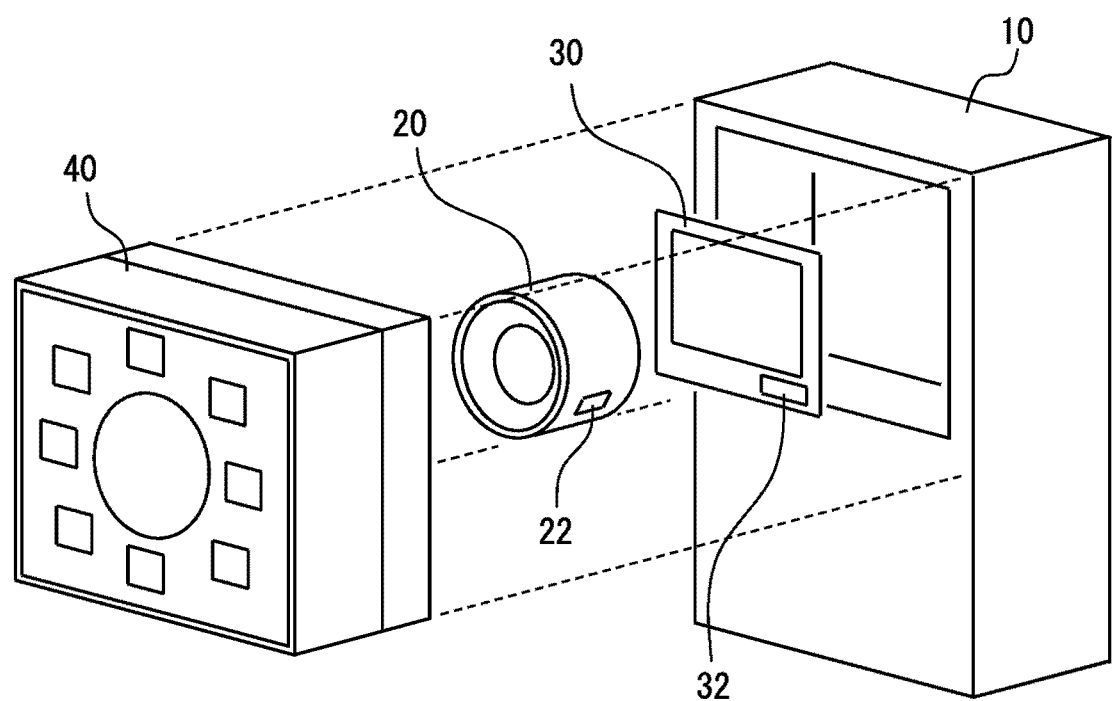
FIG. 9 is a diagram illustrating a modification example of the image sensor.

Various modifications can be made to the image sensors 1 according to the above-described embodiments. For example, the lens module 20 may be modified to a module including a light source (LED or the like) for illuminating a subject. In addition, as schematically illustrated in FIG. 9, the main body module 10 may be modified to a module on which a light source for illumination and a light source for illuminating the subject can also be mounted. In a case where the imaging elements 31 within the respective imaging modules 30 have the same pixel size, the size information may be set to be only the number of pixels, and the acquisition unit 15 may be configured as a unit which sets the size information (that is, the number of pixels) acquired from the imaging module 30 and a preset pixel size in the correction unit 11. Further, in a case where the imaging elements 31 within the respective imaging modules 30 have the same number of pixels, the size information may be set to be only a pixel size, and the acquisition unit 15 may be configured as a unit that sets the size information (that is, the pixel size) acquired from the imaging module 30 and a preset number of pixels in the correction unit 11.

APPENDIX

1. An image sensor including:
a main body module (10); and
a lens module (20) and an imaging module (30) which are mounted on the main body module (10),
wherein the main body module (10) comprises:
an acquisition unit (15) which acquires a size information indicating a number of pixels and/or a pixel size of an imaging element (31) provided within the imaging module (30) from the mounted imaging module (30), and acquires a distortion aberration characteristic information indicating distortion aberration characteristics of an optical system (21) provided within the lens module (20) from the mounted lens module (20), and
a correction unit (11) which performs distortion aberration correction on an image data output by the imaging module (30) by using the size information and the distortion aberration characteristic information acquired by the acquisition unit (15).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image sensor comprising:
a main body module; and
a lens module and an imaging module removably mounted on the main body module,
wherein the main body module comprises a controller configured to:
acquire a size information indicating a number of pixels and/or a pixel size of an imaging element provided within the imaging module from the mounted imaging module, and acquire a distortion aberration characteristic information indicating distortion aberration characteristics of an optical system provided within the lens module from the mounted lens module, and
perform distortion aberration correction on an image data output by the imaging module by using the size information and the acquired distortion aberration characteristic information, wherein
the controller acquires the distortion aberration characteristic information based on a zoom setting value of the lens module from the mounted lens module in a case where a zoomable lens module is mounted on the main body module, and
the controller performs the distortion aberration correction by calculating a distance of a designate pixel from an optical axis of the lens module using coordinates of the designate pixel for which a pixel value is to be calculated in the image data and the pixel size set in the size information, calculating a distortion aberration from the distance using the distortion aberration characteristic information and calculating a correction coefficient from the calculated distortion aberration, multiplying the coordinates of the designate pixel by the correction coefficient, and obtaining a pixel value of the coordinates after multiplication from the image data as the pixel value of the designate pixel, wherein
the controller calculates the distortion aberration $D(r)$ according to the distance $r'$ of the designate pixel in the image data from the optical axis of the lens module and a distance $r$ of a pixel corresponding to the designate pixel in an ideal image from the optical axis of the lens module by an equation:

$$D(r)[\%]=100\cdot(r'-r)/r,\text{ and wherein}$$

the controller calculates the correction coefficient $C(r)$ from the calculated distortion aberration $D(r)$ by an equation:

$$C(r)=1+D(r)/100.$$

2. The image sensor according to claim 1, wherein the controller obtaining the pixel value of the coordinates after multiplication from the image data using a nearest neighbor method, a bi-linear method, or a bicubic method as the pixel value of the designate pixel.

* * * * *